United States Patent
Inaba et al.

(10) Patent No.: US 9,898,154 B2
(45) Date of Patent: Feb. 20, 2018

(54) INFORMATION INPUT UNIT

(71) Applicant: Brother Kogyo Kabushiki Kaisha, Nagoya-shi, Aichi-ken (JP)

(72) Inventors: Takehiko Inaba, Chita-gun (JP); Atsushi Kasugai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 117 days.

(21) Appl. No.: 14/863,537

(22) Filed: Sep. 24, 2015

(65) Prior Publication Data

US 2016/0188046 A1 Jun. 30, 2016

(30) Foreign Application Priority Data

Dec. 25, 2014 (JP) ................. 2014-263244

(51) Int. Cl.
*G06F 3/046* (2006.01)
*G06F 3/0354* (2013.01)
*B42F 7/02* (2006.01)
*B42F 13/00* (2006.01)
*A45C 11/00* (2006.01)
(Continued)

(52) U.S. Cl.
CPC ............... *G06F 3/046* (2013.01); *B42F 7/02* (2013.01); *B42F 13/0006* (2013.01); *G06F 3/03545* (2013.01); *A45C 3/02* (2013.01); *A45C 2011/003* (2013.01); *A45C 2013/025* (2013.01); *G06F 2203/04102* (2013.01)

(58) Field of Classification Search
CPC ...................... G06F 3/0421; G06F 2203/04109
See application file for complete search history.

(56) References Cited

U.S. PATENT DOCUMENTS 9,495,322 B1* 11/2016 Belin .................. G06F 15/0208
2007/0195009 A1* 8/2007 Yamamoto ............ G06F 1/1652
345/1.1
(Continued)

FOREIGN PATENT DOCUMENTS

JP 2011-253266 A 12/2011
JP 2013-200847 A 10/2013
(Continued)

OTHER PUBLICATIONS

Dec. 5, 2017 - (JP) Notification of Reasons for Rejection—App 2014-263244, Eng Tran.

*Primary Examiner* — Sahlu Okebato
(74) *Attorney, Agent, or Firm* — Banner & Witcoff, Ltd.

(57) ABSTRACT

An information input unit includes a detection portion and a first protective member, and acquires information input with a writing instrument by detecting a position of the writing instrument. The detection portion can be folded along a first axis. The first protective member includes an insertion portion. An opening is formed in an opposing face of the insertion portion that faces toward the first axis. At least a portion of the detection portion is inserted into the first protective member such that a first length becomes shorter than a second length. The first length is a length between the opening and an edge of the detection portion that is on the opposite side from the opposing face. The edge of the detection portion is contained in the first protective member. The second length is the length between the edge of the detection portion and the first axis.

8 Claims, 9 Drawing Sheets

(51) Int. Cl.
 *A45C 13/02* (2006.01)
 *A45C 3/02* (2006.01)

(56) References Cited

U.S. PATENT DOCUMENTS

| | | | |
|---|---|---|---|
| 2011/0191710 A1* | 8/2011 | Jang | G06F 15/025 |
| | | | 715/776 |
| 2014/0132554 A1 | 5/2014 | Sakabe et al. | |
| 2014/0313170 A1 | 10/2014 | Sugimura | |
| 2014/0313432 A1 | 10/2014 | Kasugai et al. | |

FOREIGN PATENT DOCUMENTS

| | | |
|---|---|---|
| JP | 2014-096071 A | 5/2014 |
| JP | 2014-211754 A | 11/2014 |
| JP | 2014-211772 A | 11/2014 |

\* cited by examiner

INFORMATION INPUT UNIT

CROSS-REFERENCE TO RELATED APPLICATION

This application claims priority to Japanese Patent Application No. 2014-263244 filed Dec. 25, 2014, the content of which is hereby incorporated herein by reference.

BACKGROUND

The present disclosure relates to an electromagnetic induction type of information input unit that is capable of acquiring information that a user has input using a writing instrument.

An information input unit is known that is capable of inputting data that correspond to content that a user has written by hand using a writing instrument. For example, an information input unit is known that is provided with a pair of cases (hereinafter respectively called the left case and the right case). The information input unit can be flexed between the left case and the right case. The left case is provided with a first sensor. The right case is provided with a second sensor. Using the writing instrument, the user writes on a booklet-shaped paper medium that can be opened into left and right facing pages and that has been placed on the pair of the cases. The information input unit uses one of the first sensor and the second sensor to detect the positions of the writing instrument and stores the track of the writing instrument in the form of image data.

SUMMARY

However, in a case where the information input unit described above is used with the paper medium placed on the left case and the right case, it sometimes happens that the user uses the writing instrument to write on the paper medium, which is placed such that it spans the left case and the right case, in a position that is between the left case and the right case. In that case, a linear figure is inscribed on the paper medium. However, with the information input unit described above, a sensor is not provided in the area between the left case and the right case, which is the flexing portion. Therefore, in a case where the writing instrument is used to write on the paper medium in a position that is between the left case and the right case, a problem occurs in that the position of the writing instrument cannot be detected.

Various embodiments of the broad principles derived herein provide an information input unit that is able to detect the position of the writing instrument when it is close to the flexing portion.

An electromagnetic induction type of information input unit according to a first embodiment of the present disclosure includes a detection portion and a first protective member, and is able to acquire information that has been input on a recording medium by a writing instrument. The detection portion is configured to be folded along a first axis that extends in a first direction. The detection portion has a detection face that is configured to detect a position of the writing instrument when the writing instrument is close to the recording medium. The recording medium has been placed on a top face of the detection portion. The first protective member is made from a resin material. The first protective member includes an insertion portion in which an opening is formed. The opening is formed in an opposing face of the insertion portion. The opposing face of the insertion portion faces toward the first axis. At least a portion of the detection portion is inserted into the first protective member such that a first length becomes shorter than a second length. The first length is a length between the opening and an edge of the detection portion that is on the opposite side from the opposing face. The edge of the detection portion is contained in the first protective member. The second length is the length between the edge of the detection portion and the first axis.

BRIEF DESCRIPTION OF THE DRAWINGS

Embodiments will be described below in detail with reference to the accompanying drawings in which.

DETAILED DESCRIPTION

Figure 1:
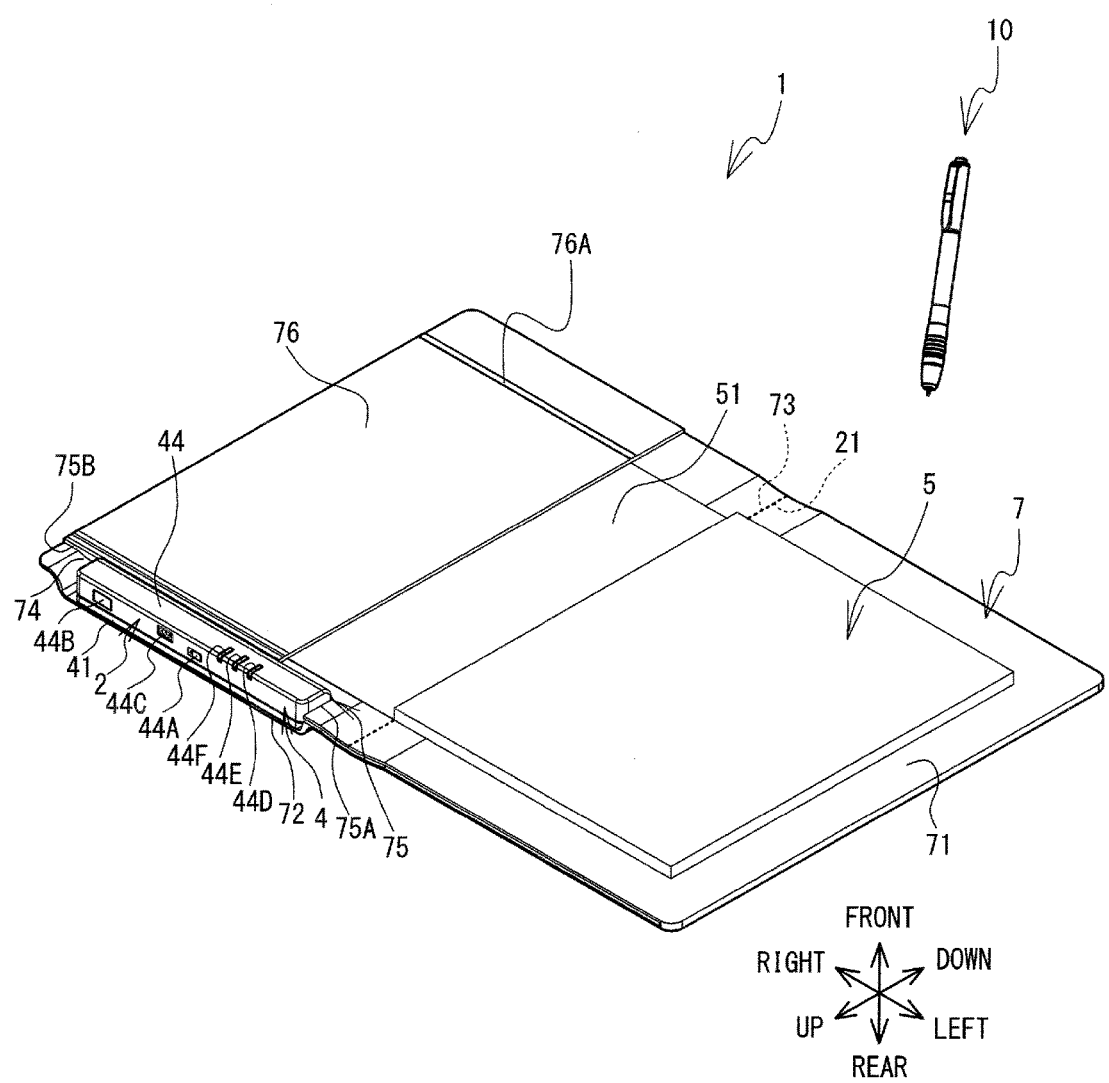
FIG. 1 is an oblique view of an information input unit 1 from above, to the left, and in front.

Hereinafter, an embodiment of the present disclosure will be explained with reference to the drawings. The referenced drawings are used for explaining technological features that the present disclosure can utilize. Configurations and the like of units that are depicted in the drawings are merely explanatory examples and do not serve to restrict the present disclosure to only those configurations and the like. In the explanation that follows, the top side, the bottom side, the upper left side, the lower right side, the lower left side, and the upper right side in FIG. 1 respectively define the front side, the rear side, the right side, the left side, the top side, and the bottom side of an information input unit 1.

An overview of the information input unit 1 according to the present embodiment will be explained with reference to FIG. 1. The information input unit 1 is a tablet-type handwriting input unit that can be folded in the left-right direction (that is, folded in half) and carried by a user. As shown in FIG. 1, the information input unit 1 is provided in a state (hereinafter called the assembled state) in which a detection unit 2 is assembled into a notebook cover 7.

A recording medium in the shape of a booklet in which a plurality of sheets of paper are bound along part of an edge portion, such as a notebook 5 that is provided with a cover 51, for example, is used in the information input unit 1. The user mounts the notebook 5 on the notebook cover 7 and enters information in the notebook 5 with an electronic pen 10. The electronic pen 10 is a writing instrument that can enter information (a text character, a symbol, a graphic figure, a numeral, or the like) in ink in the notebook 5 and can input the entered information to the detection unit 2. The electronic pen 10 of the present embodiment is provided in its interior with a variable-capacitance capacitor, a coil, and the like (not shown in the drawings) that make up a known resonant (tuning) circuit. When the electronic pen 10 comes close to the detection unit 2, the detection unit 2 detects the position of the electronic pen 10 by a known electromagnetic induction method. In this manner, the information input unit 1 uses the detection unit 2 to acquire, in the form of stroke data, the information that has been entered in the notebook 5 by the electronic pen 10.

The information input unit 1 of the present embodiment is able to use Bluetooth (registered trademark) (hereinafter called BT) to communicate with a smart phone that is not shown in the drawings, for example, that is positioned nearby. The stroke data that are acquired by the detection unit 2 are forwarded to the smart phone in accordance with a forwarding command that the user has input, for example. Based on the stroke data that have been forwarded from the information input unit 1, the smart phone is able to create and display an image file in which the information that was entered in the notebook 5 has been converted into electronic form.

Figure 2:
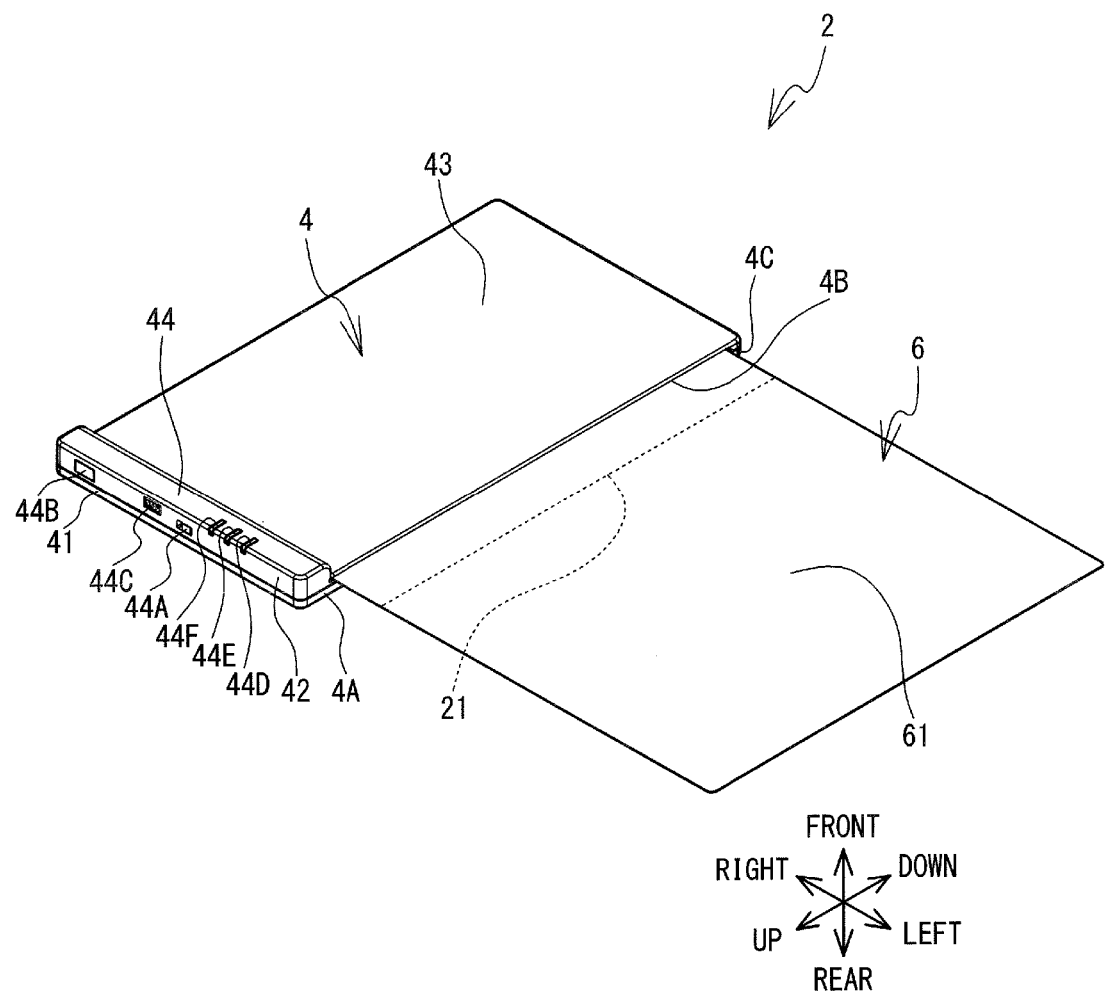
FIG. 2 is an oblique view of a detection unit 2 from above, to the left, and in front.
Figure 3:
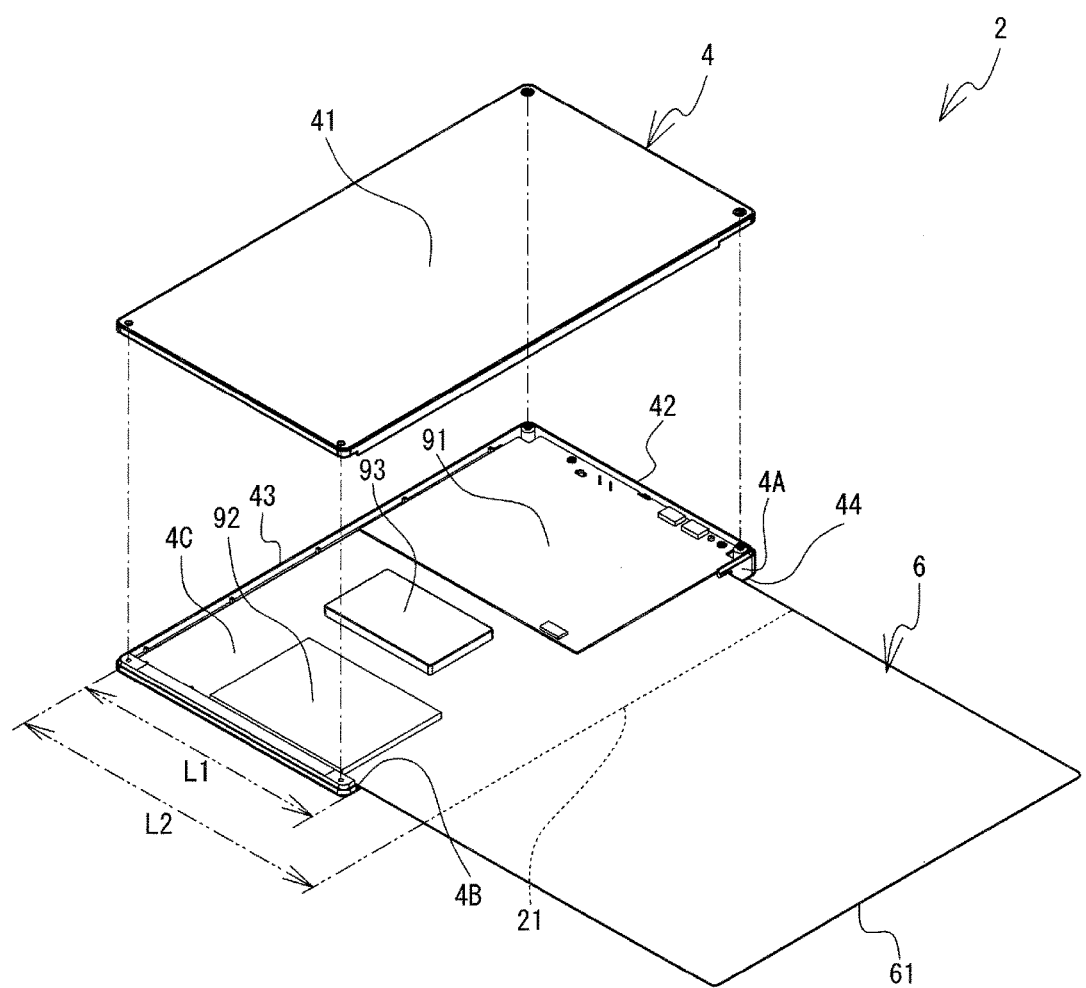
FIG. 3 is an illustrated parts breakdown of the detection unit 2.

The structure of the information input unit 1 according to the present embodiment will be explained with reference to FIGS. 1 to 4. The detection unit 2 will be explained with reference to FIGS. 2 and 3. FIG. 2 shows the detection unit 2 in a state in which the notebook cover 7 has been removed. FIG. 3 shows the detection unit 2 in a state in which a rear cover 41 and a front cover 42 have been removed.

As shown in FIGS. 2 and 3, the detection unit 2 is mainly provided with one sensor circuit board 6 and a resin cover 4. The sensor circuit board 6 is a single-sided printed circuit board that is made of polyimide, for example. On the front face of the sensor circuit board 6 (hereinafter called the detection face 61), a plurality of long, thin loop coils are arrayed in both the left-right direction and the up-down direction. The sensor circuit board 6 is able to detect the position of the electronic pen 10 (refer to FIG. 1) when it has come close to the detection face 61. The shape of the sensor circuit board 6 is a plate shape that is rectangular in a front view, with its long axis extending in the left-right direction. The size of the sensor circuit board 6 is slightly larger than A4 size. The sensor circuit board 6 has flexibility. The sensor circuit board 6 is folded along a folding axis (hereinafter called the first axis 21), such that the detection face 61 forms a two-page spread. The first axis 21 is positioned in a central portion of the sensor circuit board 6 in the left-right direction. Note that it is also acceptable for the first axis 21 not to be positioned in the central portion of the sensor circuit board 6 in the left-right direction.

The resin cover 4 is made of a rigid resin that blocks static electricity. The resin cover 4 is substantially a three-dimensional rectangular shape that is thin in the front-rear direction, and it is configured from the rear cover 41 and the front cover 42. The shape of the rear cover 41 is a plate shape that is rectangular in a front view, with its long axis extending in the up-down direction, and walls that project toward the front are formed on four edges, such that the front side of the rear cover 41 is open. The length of the rear cover 41 in the up-down direction is slightly longer than the length of the sensor circuit board 6 in the up-down direction. The length of the rear cover 41 in the left-right direction is slightly shorter than one-half of the length of the sensor circuit board 6 in the left-right direction. The front cover 42 is provided on the front side of the rear cover 41. The front cover 42 is provided with a flat plate portion 43 and a first projecting portion 44. The shape of the flat plate portion 43 is a plate shape that is rectangular in a front view, with its long axis extending in the up-down direction. The lengths of the flat plate portion 43 in the up-down direction and the left-right direction are equal to the lengths of the rear cover 41 in the up-down direction and the left-right direction, respectively.

An opening 4B is formed in the left side face of the resin cover 4 (hereinafter called the opposing face 4A). The opening 4B extends from close to the lower end of the opposing face 4A of the resin cover 4 to close to the first projecting portion 44. The length of the opening 4B in the up-down direction is slightly longer than the length of the sensor circuit board 6 in the up-down direction. A sensor holding portion 4C, which is a recessed portion that extends toward the right from the opening 4B, is formed in the flat plate portion 43. The length of the sensor holding portion 4C in the left-right direction is slightly shorter than the length of the flat plate portion 43 in the left-right direction. The sensor circuit board 6 is inserted into the sensor holding portion 4C from the opening 4B in a state in which the detection face 61 faces toward the front.

The first projecting portion 44 projects toward the front from the upper end portion of the flat plate portion 43. The length of the first projecting portion 44 in the front-rear direction is substantially equal to the length of the flat plate portion 43 in the front-rear direction.

As shown in FIG. 3, the length between the right edge of the sensor circuit board 6 and the opposing face 4A is defined as a first length L1. The length between the right edge of the sensor circuit board 6 and the first axis 21 is defined as a second length L2. In other words, because the first axis 21 is the center of the sensor circuit board 6, the length of the sensor circuit board 6 in the left-right direction is two times the second length L2. In this case, a state exists in which the first length L1 is less than the second length L2.

As shown in FIG. 2, a BT switch 44A is provided substantially in the center of the left-right direction of the top face of the first projecting portion 44. The BT switch 44A switches BT on and off. A power supply switch 44B is provided in the right corner of the top face of the first projecting portion 44. The power supply switch 44B switches the power supply of the information input unit 1 on and off. A USB terminal 44C is provided on the top face of the first projecting portion 44, to the right of the BT switch 44A. A USB cable can be attached to the USB terminal 44C. By being connected by the USB cable to a personal computer or the like that is not shown in the drawings, the information input unit 1 performs transmission and receiving of data and performs charging of a battery pack 93 that will be described later.

Indicators 44D, 44E, 44F are provided in that order from left to right on the front face of the first projecting portion 44, to the left of the BT switch 44A. The individual indicators 44D to 44F indicate various types of statuses of the information input unit 1. Specifically, the indicator 44D shows a blue light when BT is on. The indicator 44E shows a green light when the power supply is on and shows an orange light when the sensor circuit board 6 has detected a signal from the electronic pen 10, which will be described later. The indicator 44F shows a red light when the remaining capacity of the battery pack 93 becomes less than a specified value. In the present disclosure, the number of the indicators is not limited to three, and the number may also be more than three or less than three. Furthermore, in the present disclosure, the colors of the light that the indicators emit and the conditions under which the indicators emit light are not limited, as long as specified colors are emitted under specified conditions.

As shown in FIG. 3, a main circuit board 91, a sensor control circuit board 92, and the battery pack 93 are the main items contained in the interior of the resin cover 4. The main circuit board 91 is disposed in the area above the approximate center of the sensor holding portion 4C, to the rear of the sensor circuit board 6. The sensor control circuit board 92 is disposed in the lower left corner of the sensor holding portion 4C, to the rear of the sensor circuit board 6. The battery pack 93 is disposed approximately in the center of the sensor holding portion 4C, to the rear of the sensor circuit board 6.

Figure 4:
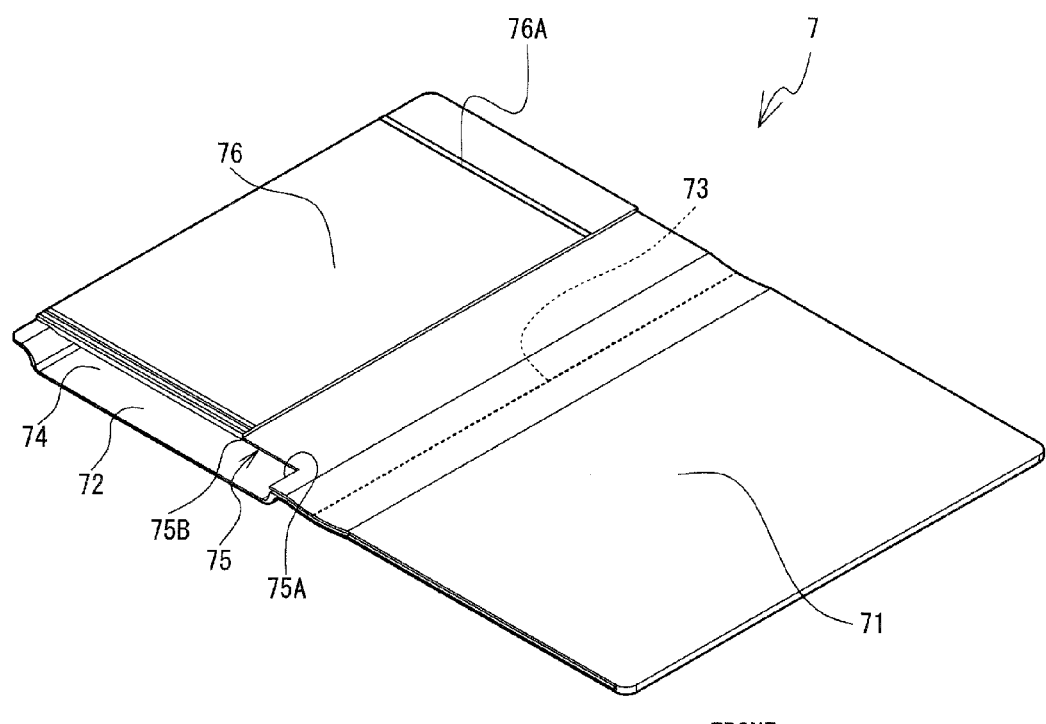
FIG. 4 is an oblique view of a notebook cover 7 from above, to the left, and in front.
Figure 4:
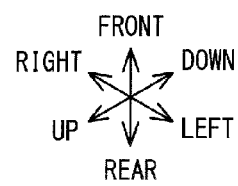

The notebook cover 7 will be explained with reference to FIGS. 1 and 4. FIG. 4 show the notebook cover 7 in a state in which the detection unit 2 has been removed. The notebook cover 7 is made of flexible artificial leather, for example. The notebook cover 7 is folded along a folding axis (hereinafter called the second axis 73), such that its front face forms a two-page spread. The second axis 73 is positioned in a central portion of the notebook cover 7 in the left-right direction. Note that the notebook cover 7 needs only to be made of a material that flexes in the central portion in the left-right direction. It is preferable for the notebook cover 7 to be made of a material that blocks static electricity.

The notebook cover 7 is mainly provided with a front sheet 71, a rear sheet 72, and a holding sheet 76. The shapes of the front sheet 71 and the rear sheet 72 are sheet shapes that are substantially rectangular in a front view, with their long axes both extending in the left-right direction. The right side portion of the upper side of the rear sheet 72 is recessed slightly toward the rear. The lengths of the front sheet 71 and the rear sheet 72 in the left-right direction are both slightly longer than the length of the sensor circuit board 6 in the left-right direction. The lengths of the front sheet 71 and the rear sheet 72 in the up-down direction are both slightly longer than the length of the resin cover 4 in the up-down direction. The front sheet 71 is disposed such that it overlays the front face of the rear sheet 72. The left edge, the right edge, and the bottom edge of the front sheet 71 are sewn together with the left edge, the right edge, and the bottom edge of the rear sheet 72, respectively. In other words, only the upper edges of the front sheet 71 and the rear sheet 72 are open, so in the notebook cover 7, a first containing portion 74 is formed between the front sheet 71 and the rear sheet 72. Note that the notebook cover 7 may also be made by configuring the front sheet 71 and the rear sheet 72 such that they are formed by folding over a portion of a single notebook-shaped member.

A notched portion 75 is formed in the upper part of the right side of the front sheet 71. The notched portion 75 is provided with a left edge portion 75A and a lower edge portion 75B. The length of the left edge portion 75A in the up-down direction is substantially equal to the length of the first projecting portion 44 in the up-down direction. The length of the lower edge portion 75B is slightly longer than the length of the first projecting portion 44 in the left-right direction.

The holding sheet 76 is provided on the right side of the front face of the front sheet 71. The shape of the holding sheet 76 is a sheet shape that is rectangular in a front view, with its long axis extending in the up-down direction. The length of the holding sheet 76 in the left-right direction is slightly shorter than the length of the resin cover 4 in the left-right direction. The length of the holding sheet 76 in the up-down direction is equal to the length between the lower edge portion 75B of the notched portion 75 and the bottom edge of the front sheet 71. Note that the length of the holding sheet 76 in the left-right direction needs only to be shorter than the length between the right side of the resin cover 4 and the second axis 73. The length of the holding sheet 76 in the up-down direction needs only to be longer than the length of the notebook 5 in the up-down direction.

The bottom edge, the right edge, and the top edge of the holding sheet 76 are respectively sewn together with the bottom edge and the right edge of the front sheet 71, and with an area close to the lower edge of the lower edge portion 75B of the notched portion 75. The holding sheet 76 is also sewn together with the front sheet 71 in the left-right direction in a notebook holding portion 76A that is above the lower edge of the holding sheet 76. The length between the notebook holding portion 76A and the upper edge of the holding sheet 76 is slightly longer than the length of the notebook 5 in the up-down direction. The cover 51 of the notebook 5 is inserted between the holding sheet 76 and the front sheet 71 and held above the notebook holding portion 76A. Note that it is also acceptable for the upper edge of the holding sheet 76 not to be sewn.

The information input unit 1 in the assembled state will be explained with reference to FIG. 1. The detection unit 2 is stowed in the first containing portion 74 through the opening on the top side of the notebook cover 7, such that the first projecting portion 44 is disposed on the upper right part of the front side of the notebook cover 7. Next, the front sheet 71 and the rear sheet 72 are sewn together from the upper left corner of the front sheet 71 to the left edge portion 75A of the notched portion 75, such that the information input unit 1 is in the assembled state.

In the assembled state, the left edge portion and the lower edge portion at the base of the first projecting portion 44 are respectively in contact with the left edge portion 75A and the lower edge portion 75B of the notched portion 75 of the notebook cover 7. The first projecting portion 44 projects toward the front from the notched portion 75. The positions of the first axis 21 of the detection unit 2 and the second axis 73 of the notebook cover 7 are substantially congruent in the left-right direction. In other words, in the assembled state, the detection unit 2 and the notebook cover 7 can be folded, with the first axis 21 and the second axis 73 serving as the folding axes.

Figure 5:
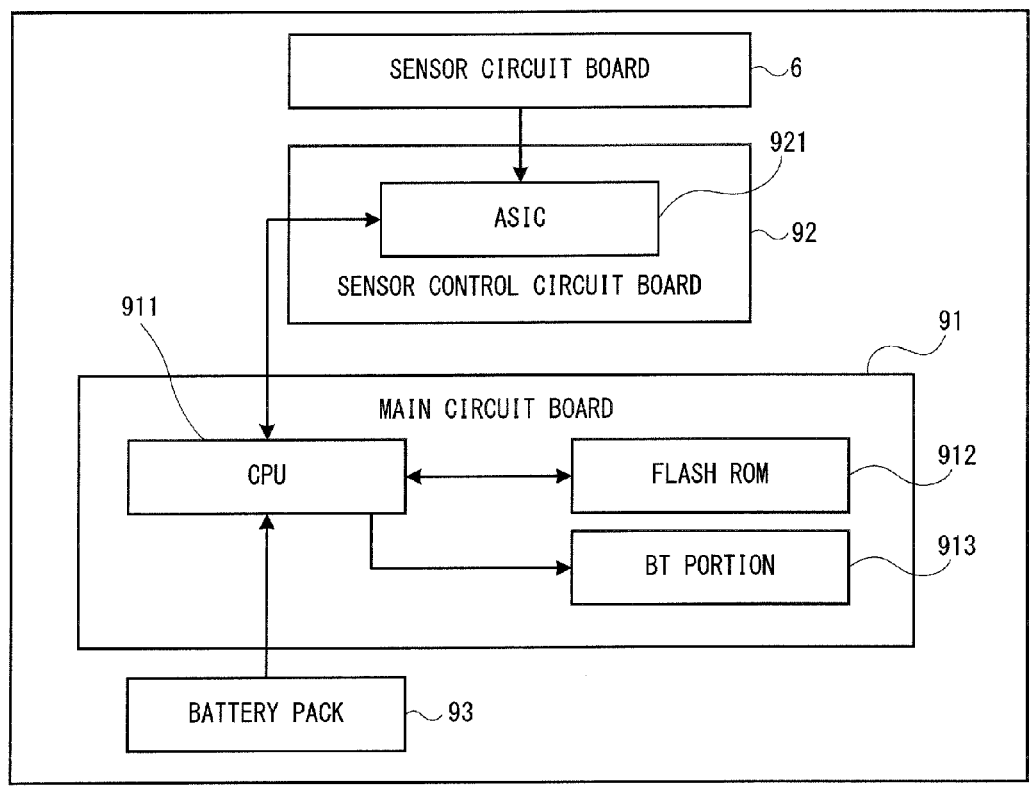
FIG. 5 is a block diagram that shows an electrical configuration of the information input unit 1.

The electrical structure of the information input unit 1 according to the present embodiment will be explained with reference to FIG. 5. The main circuit board 91 is provided with a CPU 911, a flash ROM 912, a BT portion 913, and the like. The flash ROM 912 and the BT portion 913 are electrically connected to the CPU 911. The CPU 911 performs control of the detection unit 2. Various types of programs, the stroke data, and the like are stored in the flash ROM 912. The various types of programs are executed in order for the CPU 911 to control the detection unit 2. The stroke data indicate the track of the electronic pen 10 that enters the information in the notebook 5. The BT portion 913 is a controller for using BT to perform communication with an electronic device that is positioned nearby.

The sensor control circuit board 92 is provided with an ASIC 921. The ASIC 921 of the sensor control circuit board 92 is electrically connected to the sensor circuit board 6 and the CPU 911 of the main circuit board 91. In a case where the electronic pen 10 performs an entering operation close to the sensor circuit board 6, the CPU 911 controls the ASIC 921 to acquire the stroke data based on the entering operation.

The battery pack 93 is electrically connected to the CPU 911 of the main circuit board 91. Power is thus supplied to the main circuit board 91 from the battery pack 93.

According to the information input unit 1, the sensor circuit board 6 is flexible, and a state exists in which the first length L1 is less than the second length L2, so the detection unit 2 folds along the first axis 21. For example, the user may use the information input unit 1 by aligning the bound portion of the notebook 5 to the first axis 21 and placing the notebook 5 on the front face of the notebook cover 7. The notebook 5 is in the shape of a booklet in which a plurality of sheets of paper are bound along a part of an edge portion. When the user uses the electronic pen 10 to input information into the notebook 5, the information that is input is positioned over the first axis 21 in some cases. In that case, because the sensor circuit board 6 of the detection unit 2 is also provided on the first axis 21, which is the folding axis, the information input unit 1 is able to detect the position of the electronic pen 10 that is close to the first axis 21.

According to the information input unit 1, the power supply switch 44B and the indicators 44D to 44F are provided in the first projecting portion 44, which projects toward the front. The user can thus easily recognize the indicators 44D to 44F visually and can immediately know the various types of statuses. The user can also easily switch the power supply on and off.

According to the information input unit 1, the main circuit board 91, the sensor control circuit board 92, the battery pack 93, and the like are contained in the resin cover 4, which is made of a rigid resin. This configuration makes it possible for the resin cover 4 to protect members such as the circuit boards and the like that are contained in the resin cover 4 from impact from the outside. Furthermore, because the resin cover 4 is made from a resin that blocks static electricity, members such as the circuit boards and the like that are contained in the resin cover 4 are protected from static electricity.

According to the information input unit 1, the sensor circuit board 6 is contained in the first containing portion 74, which is provided in the notebook cover 7. The notebook cover 7 is thus able to protect the sensor circuit board 6 from impact from the outside. In a case where the notebook cover 7 is made from a material that blocks static electricity, the sensor circuit board 6 is protected from static electricity by the notebook cover 7. Therefore, in the information input unit 1, malfunctioning due to static electricity is inhibited.

According to the information input unit 1, the first projecting portion 44 projects toward the front from the front face of the notebook cover 7. The left edge portion and the lower edge portion at the base of the first projecting portion 44 are respectively in contact with the left edge portion 75A and the lower edge portion 75B of the notched portion 75 that is formed in the notebook cover 7. Because of this configuration, the positional relationship between the resin cover 4 and the notebook cover 7 is fixed. The notebook 5 is also held by the holding sheet 76 of the notebook cover 7 at the right edges of the holding sheet 76 and the notebook holding portion 76A. Because of this configuration, the positional relationship between the notebook cover 7 and the notebook 5 is fixed, so the information input unit 1 is able to detect properly the information that the user has input into the notebook 5.

According to the information input unit 1, the first axis 21 is positioned in the central portion of the sensor circuit board 6 in the left-right direction. Ordinarily, the user places the notebook 5 on the information input unit 1 by aligning the bound portion of the notebook 5 to the central portion of the information input unit 1 in the left-right direction. In that case, because the first axis 21 is positioned in the central portion of the sensor circuit board 6 in the left-right direction, the bound portion of the notebook 5 is substantially aligned with the first axis 21. Therefore, the information input unit 1 is easily folded along the first axis 21 in a state in which it holds the notebook 5.

The present disclosure is not limited to the embodiment that is described above, and modifications can be made within the scope of the claims. For example, it is acceptable for the information input unit 1 not to be provided with the holding sheet 76. In that case, the information input unit 1 needs only to be able to fix the positional relationship between the notebook 5 and the notebook cover 7 in the same manner that the holding sheet 76 functions. For example, the positional relationship between the notebook 5 and the notebook cover 7 may also be fixed by double-sided adhesive tape, or the like, instead of by the holding sheet 76. Clips that are energized toward the front face of the notebook cover 7 may also be provided at the four corners of the front face of the notebook cover 7, and the positional relationship between the notebook 5 and the notebook cover 7 may be fixed by the clips. In that case, because the positional relationship between the notebook 5 and the notebook cover 7 is fixed, the information input unit 1 is able to detect properly the information that the user has input into the notebook 5.

In the information input unit 1, the sensor circuit board 6 is not limited to being a single-sided printed circuit board that is made of polyimide. As long as the sensor circuit board 6 is capable of flexing along the first axis 21, which is in the center in the left-right direction, the sensor circuit board 6 may also be configured from a plurality of the sensor circuit boards. It is also acceptable for the sensor circuit board 6 not to be capable of flexing somewhere other than in the center. For example, the sensor circuit board may also be configured from a total of three circuit boards by using a single, flexible circuit board in the area that includes the first axis 21 and using rigid circuit boards that are not flexible on the left side and the right side. In that case, because the sensor circuit board 6 is provided along the first axis 21, which is the folding axis, the information input unit 1 is able to detect the position of the electronic pen 10 that is close to the first axis 21.

The size, the format, the material, and the like of the notebook 5 are not limited to those in the embodiment that is described above. The notebook cover 7 needs only have a size that allows at least the detection unit 2 and the notebook 5 to be attached to it.

Figure 6:
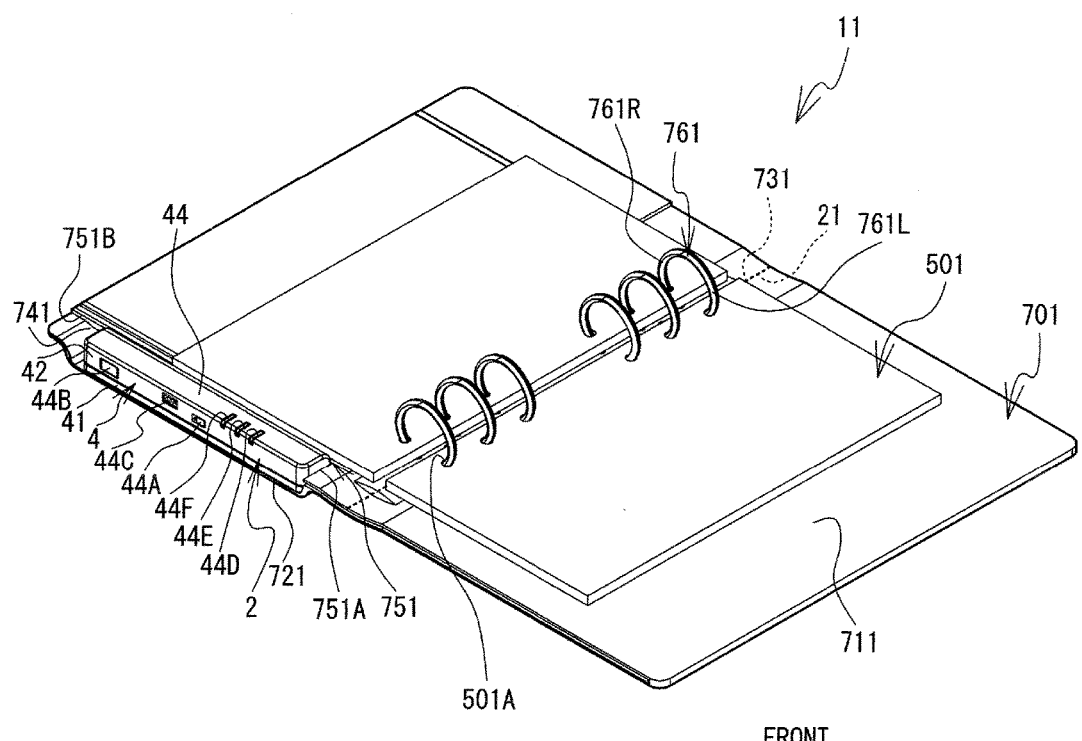
FIG. 6 is an oblique view of an information input unit 11 from above, to the left, and in front.
Figure 6:
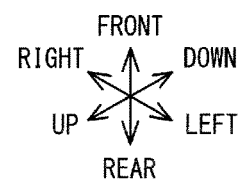

Instead of being provided with the notebook cover 7 that is shown in FIG. 1, the information input unit 1 may be provided with a notebook cover 701, as is an information input unit 11 that is shown in FIG. 6. The information input unit 11 will now be explained with reference to FIG. 6. Note that the detection unit 2 is identical to the one in the information input unit 1 that is shown in FIG. 1, so the same reference numerals will be assigned, and an explanation will be omitted. The electrical configuration of the information input unit 11 is identical to that of the information input unit 1, as shown in FIG. 5, so an explanation will be omitted.

The notebook cover 701 is made of flexible artificial leather, for example. The notebook cover 701 is folded along a folding axis (hereinafter called the second axis 731), such that its front face forms a two-page spread. The second axis 731 is positioned in a central portion of the notebook cover 701 in the left-right direction. Note that the notebook cover 701 needs only to be made of a material that flexes in the central portion in the left-right direction. It is preferable for the notebook cover 701 to be made of a material that blocks static electricity.

The notebook cover 701 is mainly provided with a front sheet 711, a rear sheet 721, and six binder rings 761. The shapes of the front sheet 711 and the rear sheet 721 are the same sheet shapes as those of the front sheet 71 and the rear sheet 72, respectively. A first containing portion 741, a notched portion 751, a left edge portion 751A, and a lower edge portion 751B respectively correspond to the first containing portion 74, the notched portion 75, the left edge portion 75A, and the lower edge portion 75B of the information input unit 1.

The detection unit 2 is stowed in the first containing portion 741 from the top side of the notebook cover 701, such that the first projecting portion 44 is disposed on the upper right part of the front side of the notebook cover 701. The left edge portion and the lower edge portion at the base of the first projecting portion 44 are respectively in contact with the left edge portion 751A and the lower edge portion 751B of the notched portion 751 of the notebook cover 701. That is, in the assembled state, the first projecting portion 44 projects toward the front from the notched portion 751.

A point on which the notebook cover 701 differs from the notebook cover 7 is that the six binder rings 761 are provided instead of the holding sheet 76. The six binder rings 761 are provided along the second axis 731 such that they project toward the front from the front face of the front sheet 711. Each one of the six binder rings 761 is provided with a left ring 761L and a right ring 761R. The left ring 761L and the right ring 761R can be switched between a joined state, in which their tips are joined to one another, and a separated state, in which their tips are separated from one another. Note that the number of the binder rings 761 needs only to be not less than two.

In a case where the user uses the information input unit 11, a notebook 501 is used, for example. The notebook 501 is the same size as the cover 51 of the notebook 5. Six holes 501A are provided in the up-down direction along one edge of the notebook 501, at the same intervals as the six binder rings 761.

In this case, with the left rings 761L and the right rings 761R in a disengaged state, the user inserts either the left rings 761L or the right rings 761R into the corresponding holes 501A in the notebook 501. Next, the user engages the left rings 761L and the right rings 761R. In this way, the notebook 501 is held by the plurality of the binder rings 761. In other words, because the positional relationship between the notebook cover 701 and the notebook 501 is fixed, the information input unit 11 is able to detect properly the information that the user has input into the notebook 501.

Figure 7:
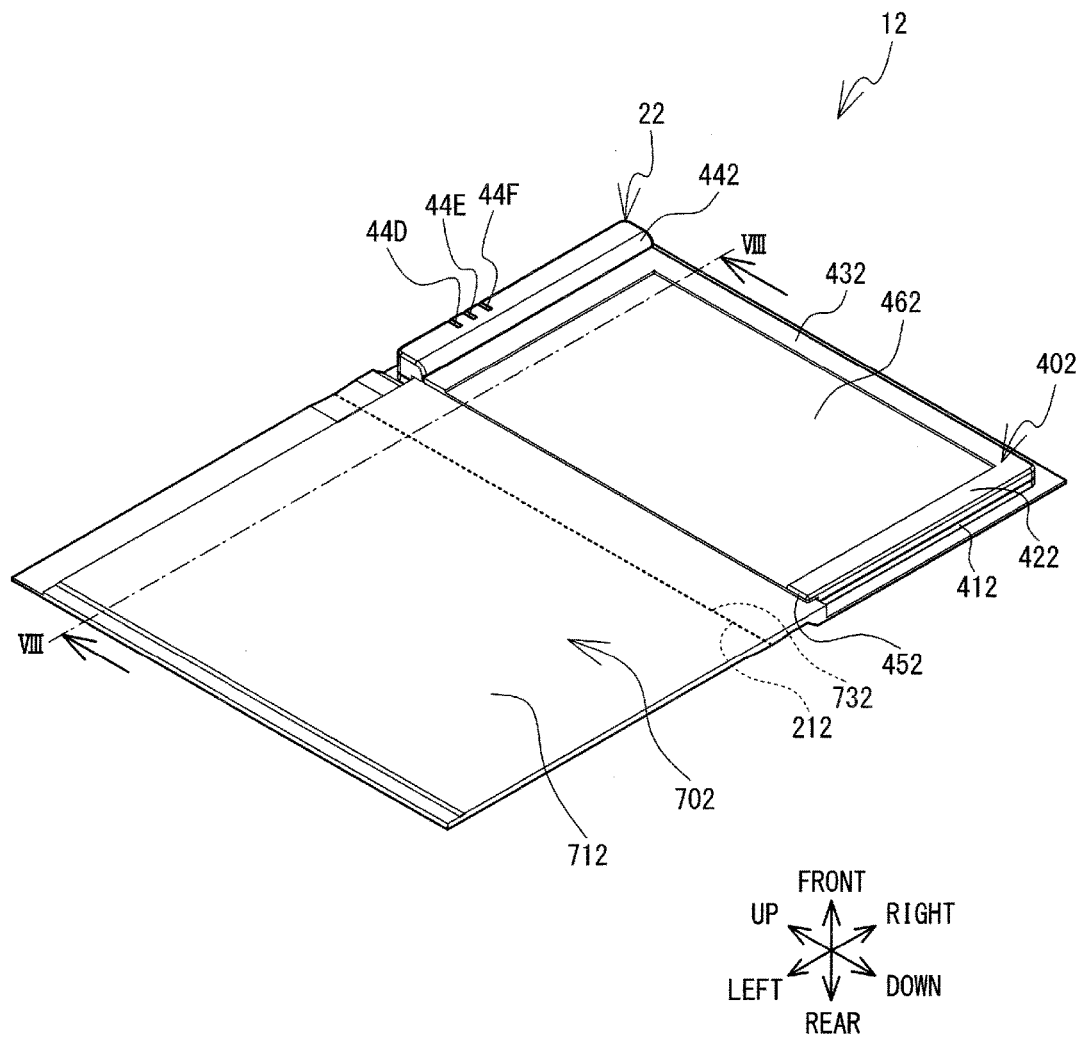
FIG. 7 is an oblique view of an information input unit 12 from below, to the left, and in front.
Figure 8:
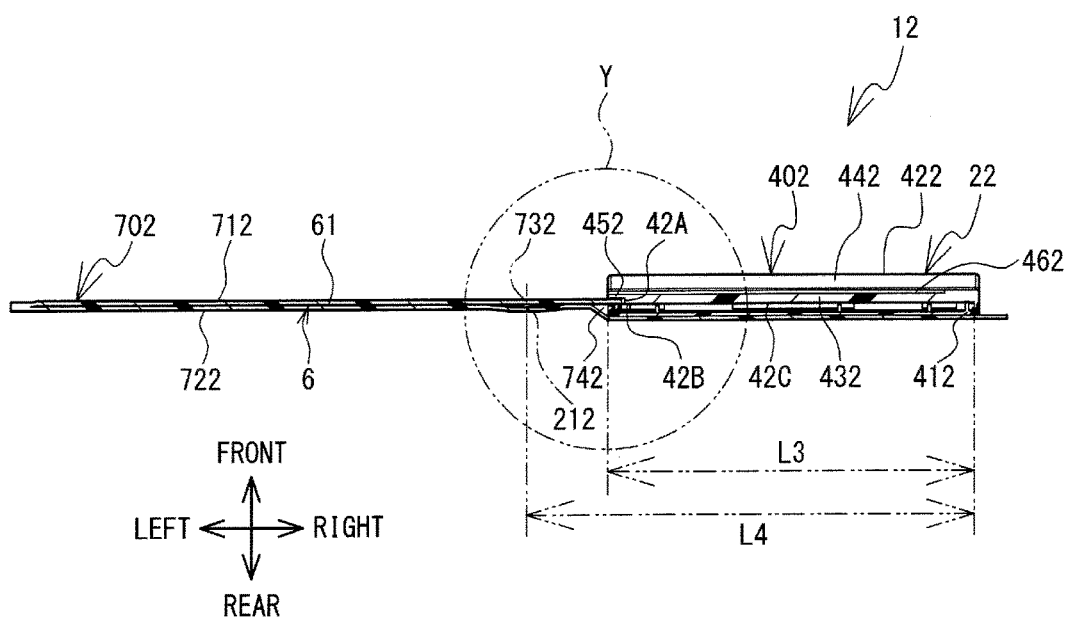
FIG. 8 is a section view from the direction of arrows on a line VIII-VIII in FIG. 7.

Instead of being provided with the detection unit 2 and the notebook cover 7 that are shown in FIG. 1, the information input unit 1 may be provided with a detection unit 22 and a notebook cover 702, as is an information input unit 12 that is shown in FIGS. 7 and 8. The information input unit 12 will now be explained with reference to FIGS. 7 to 9. Note that the sensor circuit board 6 and the indicators 44D to 44F are identical to those of the information input unit 1 that are shown in FIG. 2, so the same reference numerals will be assigned, and explanations will be omitted. A BT switch, a power supply switch, a USB terminal, a main circuit board, a sensor control circuit board, and a battery pack are identical to those of the information input unit 1 that are shown in FIGS. 2 and 3, so they are not shown in the drawings, and explanations will be omitted. The electrical configuration of the information input unit 12 is identical to that of the information input unit 1, as shown in FIG. 5, so an explanation will be omitted.

As shown in FIGS. 7 and 8, the detection unit 22 is mainly provided with a resin cover 402 and the sensor circuit board 6. The resin cover 402 is made of a rigid resin material that blocks static electricity. The resin cover 402 is provided with a rear cover 412 and a front cover 422. The shape of the rear cover 412 is identical to that of the rear cover 41.

As shown in FIG. 7, the front cover 422 is provided with a flat plate portion 432, a first projecting portion 442, and a second projecting portion 452. The shape of the flat plate portion 432 is substantially identical to that of the flat plate portion 43. A recessed portion 462 is formed in the front face of the flat plate portion 432. The shape of the recessed portion 462 is rectangular in a front view, with its long axis extending in the up-down direction. The length of the recessed portion 462 in the up-down direction is substantially equal to the length of the notebook 5 in the up-down direction. The recessed portion 462 is formed from the left edge to close to the right edge of the front cover 422.

Figure 9:
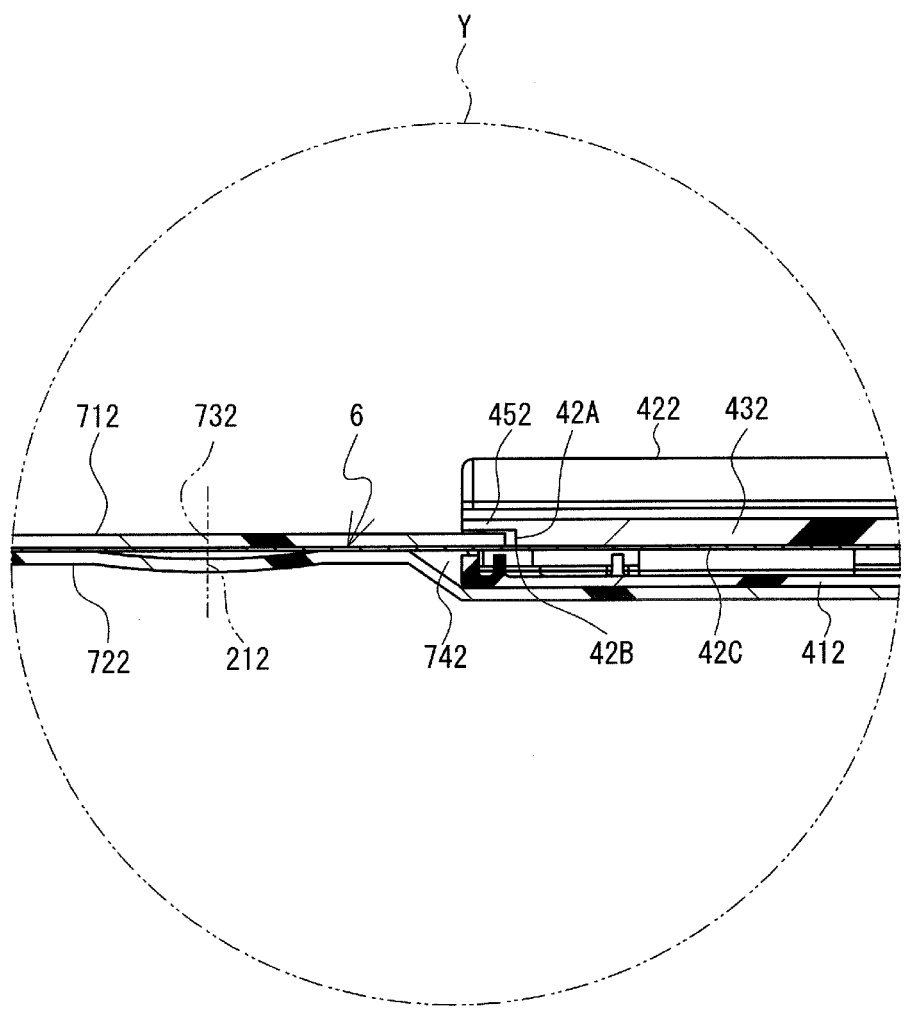
FIG. 9 is an enlarged view of an area within a circle Y in FIG. 8.

As shown in FIGS. 8 and 9, an opening 42B is formed in the left side face of the flat plate portion 432 (hereinafter called the opposing face 42A). A sensor holding portion 42C, which is a recessed portion that extends toward the right from the opening 42B, is formed in the flat plate portion 432. The opening 42B and the sensor holding portion 42C respectively correspond to the opening 4B and the sensor holding portion 4C of the information input unit 1. The sensor circuit board 6 is inserted into the sensor holding portion 42C from the opening 42B in a state in which the detection face 61 faces toward the front.

The shape of the first projecting portion 442 is identical to the shape of the first projecting portion 44. The second projecting portion 452, which projects slightly to the left, is provided on the front edge of the opposing face 42A of the front cover 422, along a virtual plane that is formed by the front face of the front cover 422. A first axis 212 corresponds to the first axis 21 of the information input unit 1.

As shown in FIG. 8, the length between the right edge of the sensor circuit board 6 and the tip of the second projecting portion 452 is defined as a third length L3. The length between the right edge of the sensor circuit board 6 and the first axis 212 is defined as a fourth length L4. In other words, because the first axis 212 is the center of the sensor circuit board 6, the length of the sensor circuit board 6 in the left-right direction is two times the fourth length L4. In this case, a state exists in which the third length L3 is less than the fourth length L4.

The BT switch that is not shown in the drawings is provided approximately in the center of the top face of the first projecting portion 442 in the left-right direction. The power supply switch that is not shown in the drawings is provided in the right corner the top face of the first projecting portion 442. The USB terminal that is not shown in the drawings is provided on the top face of the first projecting portion 442, to the right of the BT switch. The indicators 44D, 44E, 44F are provided in that order from left to right on the top face of the first projecting portion 442, to the left of the BT switch. Note that although they are not shown in the drawings, the main circuit board, the sensor control circuit board, and the battery pack are contained in the interior of the resin cover 402.

The notebook cover 702 is made of flexible artificial leather, for example. The notebook cover 702 is folded along a folding axis (hereinafter called the second axis 732), such that its front face forms a two-page spread. The second axis 732 corresponds to the second axis 73 of the information input unit 1. Note that the notebook cover 702 needs only to be made of a material that flexes in the central portion in the left-right direction. It is preferable for the notebook cover 702 to be made of a material that blocks static electricity.

The notebook cover 702 is mainly provided with a front sheet 712 and a rear sheet 722. The shape of the rear sheet 722 is identical to the shape of the rear sheet 72. The shape of the front sheet 712 is a sheet shape that is substantially rectangular in a front view. The lengths of the front sheet 712 in the left-right direction and the up-down direction are substantially equal to the length of the rear sheet 722 in the up-down direction. The front sheet 712 is disposed such that it overlays the left side of the front face of the rear sheet 722. The left edge, the top edge, and the bottom edge of the front sheet 712 are sewn together with the left edge, the top edge, and the bottom edge of the rear sheet 722, respectively. In other words, only the right edge of the front sheet 712 is open, so in the notebook cover 702, a second containing portion 742 is formed between the front sheet 712 and the rear sheet 722.

The part of the sensor circuit board 6 that is exposed is stowed in the second containing portion 742 from the right side of the front sheet 712. As shown in FIG. 8, the right edge of the front face of the front sheet 712 is in contact with the rear face of the second projecting portion 452.

Even in a case where a gap opens up between the detection unit 22 and the front sheet 712 of the information input unit 12 and static electricity is generated, for example, the static electricity is blocked by the second projecting portion 452. Therefore, in the information input unit 12, malfunctioning due to static electricity is inhibited.

The user uses the information input unit 12 by placing the notebook 5 on the front face of the information input unit 12. In this case, the notebook 5 is held by the recessed portion 462. Specifically, the notebook 5 is held in the information input unit 12 by aligning the corners of the cover 51 of the notebook 5 to the corners of the recessed portion 462. Therefore, the positional relationship between the detection unit 22 and the notebook 5 is fixed, so the information input unit 12 is able to detect properly the information that the user has input into the notebook 5.

What is claimed is:

1. An electromagnetic induction type of information input unit that is able to acquire information that has been input on a recording medium by a writing instrument, the information input unit comprising:
    a detection portion that is configured to be folded along a first axis that extends in a first direction, the detection portion having a detection face that is configured to detect a position of the writing instrument when the writing instrument is close to the recording medium and the recording medium has been placed on a top face of the detection portion, the detection portion being provided on the first axis, the first axis extending along the detection face; and
    a first protective member that is made from a resin material and that includes an insertion portion in which an opening is formed, the opening being formed in an opposing face of the insertion portion and orthogonal to the detection face, the opposing face of the insertion portion facing toward the first axis, and at least a portion of the detection portion being inserted into the first protective member such that a first length becomes shorter than a second length,
    the first length being a length between the opening and an edge of the detection portion that is on the opposite side from the opposing face, and the edge of the detection portion being contained in the first protective member, and
    the second length being the length between the edge of the detection portion and the first axis.

2. The information input unit according to claim 1, wherein
    the first protective member is provided with a first projecting portion, and
    the first projecting portion projecting from a surface that faces in the same direction as the detection face and being provided with indicators that indicate various types of statuses and with a power supply switch that is configured to switch a power supply on and off.

3. The information input unit according to claim 2, wherein the first protective member contains a main circuit board on which electronic parts are mounted and a chargeable battery pack that is the power supply.

4. The information input unit according to claim 2, further comprising:
    a first containing portion that contains all of the detection portion and at least a portion of the first protective member;
    a holding portion that holds the recording medium; and
    a second holding member that includes a contact portion and is configured to be folded along a second axis that extends in the first direction, the contact portion being in contact with at least a portion of a base of the first projecting portion,
    wherein the first projecting portion projects from a surface of the second holding member, and the surface of the second holding member faces in the same direction as the detection face.

5. The information input unit according to claim 4, wherein
    the holding portion is a plurality of pairs of half-rings that project from the second axis in a direction in which the detection face faces, and
    the pairs of the half-rings are configured to be switched between a joined state, in which tips of corresponding half-rings are joined to one another to form rings, and a separated state, in which the tips are separated from one another.

6. The information input unit according to claim 1, further comprising:
    a third holding member that includes a second containing portion that contains a portion of the detection portion that is exposed from the first protective member,
    wherein
    the first protective member is provided with a second projecting portion, the second projecting portion projecting toward the first axis from the opposing face, along a virtual plane that is formed by a face of the first protective member, and the face of the first protective member facing in the same direction as the detection face of the detection portion, and
    at least a portion of a face of the third holding member is in contact with a face of the second projecting portion, the face of the third holding member facing in the same direction as the detection face, and the face of the second projecting portion facing in the opposite direction from the detection face.

7. The information input unit according to claim 6, wherein the first protective member is provided with a recessed portion in which the recording medium is held on the face of the first protective member, the face of the first protective member facing in the same direction as the detection face.

8. The information input unit according to claim 1, wherein the first axis is positioned in a central portion of the detection portion in a second direction that is orthogonal to the first direction.

* * * * *